United States Patent [19]

Held et al.

[11] 3,929,540
[45] Dec. 30, 1975

[54] METHOD AND DRUM FOR BUILDING AND SHAPING BLANKS FOR RADIAL-PLY TIRES

[75] Inventors: Gerhard Held, Hochstadt; Walter Ballé, Dornigheim-Waldsiedlung, both of Germany

[73] Assignee: Rheinstahl Aktiengesellschaft, Essen, Germany

[22] Filed: Dec. 19, 1974

[21] Appl. No.: 534,176

Related U.S. Application Data

[63] Continuation-in-part of Ser. No. 271,125, July 12, 1972, Pat. No. 3,862,871.

[30] Foreign Application Priority Data

July 13, 1971 Germany............................ 2134904

[52] U.S. Cl. ................ 156/123; 156/126; 156/131; 156/132; 156/133; 156/416

[51] Int. Cl.² ............... B29H 17/14; B29H 17/16; B29H 17/22;B29H 17/26

[58] Field of Search ........... 156/414, 415, 123, 416, 156/126, 131, 132, 133

[56] References Cited
UNITED STATES PATENTS

| | | | |
|---|---|---|---|
| 1,289,767 | 12/1918 | Hopkinson | 156/123 |
| 1,588,585 | 6/1926 | Kearns et al. | 156/123 X |
| 1,667,263 | 4/1928 | Mather | 156/123 X |
| 1,801,759 | 4/1931 | Steinle | 156/123 X |
| 3,077,917 | 2/1963 | Appleby | 156/416 |
| 3,184,361 | 5/1965 | Allitt | 156/123 X |
| 3,402,090 | 9/1968 | Henley | 156/398 |
| 3,862,871 | 7/1972 | Held et al. | 156/415 |

*Primary Examiner*—Clifton B. Cosby
*Attorney, Agent, or Firm*—Woodhams, Blanchard and Flynn

[57] ABSTRACT

A drum for building and shaping blanks for radial-ply tires comprises two co-axial bead holders at least one of which has an extension drum which is co-axial therewith, is secured thereto and has the same outside diameter. The extension drum acts in part as a support for a tire band while the latter is being secured to the bead holders for shaping. The bead holders are movable axially relative one to the other to position the tire band for shaping and each is provided with radially movable segments to which end portions of the tire band are secured in airtight manner. During relative axial movement of the bead holders towards each other, a gaseous medium is introduced into the space bounded by the bead holders and the tire band so that the band is curved outwards to form a tire blank.

3 Claims, 18 Drawing Figures

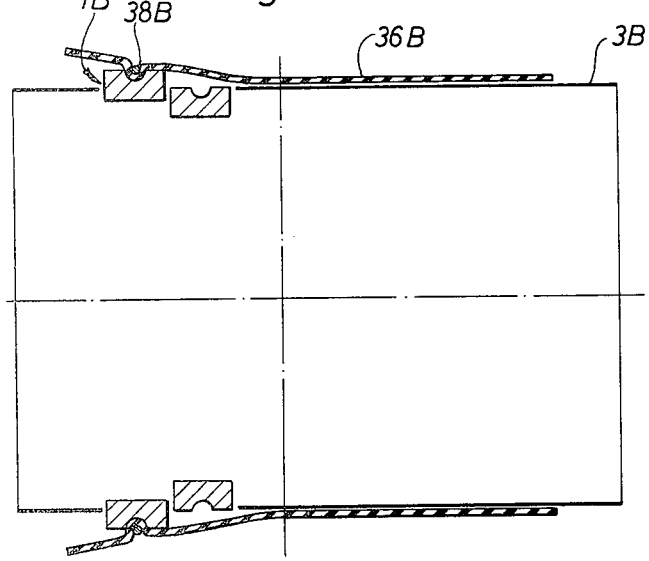
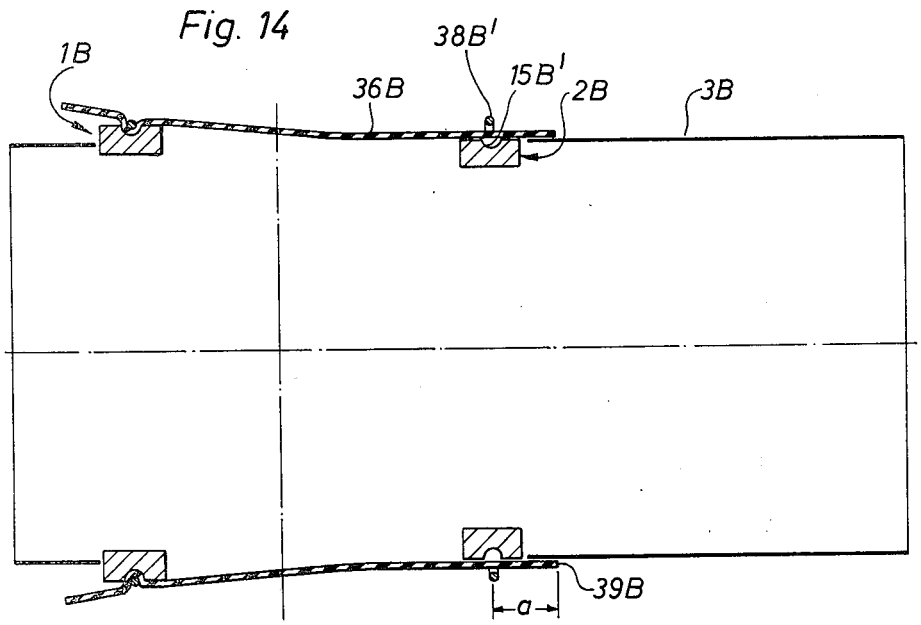

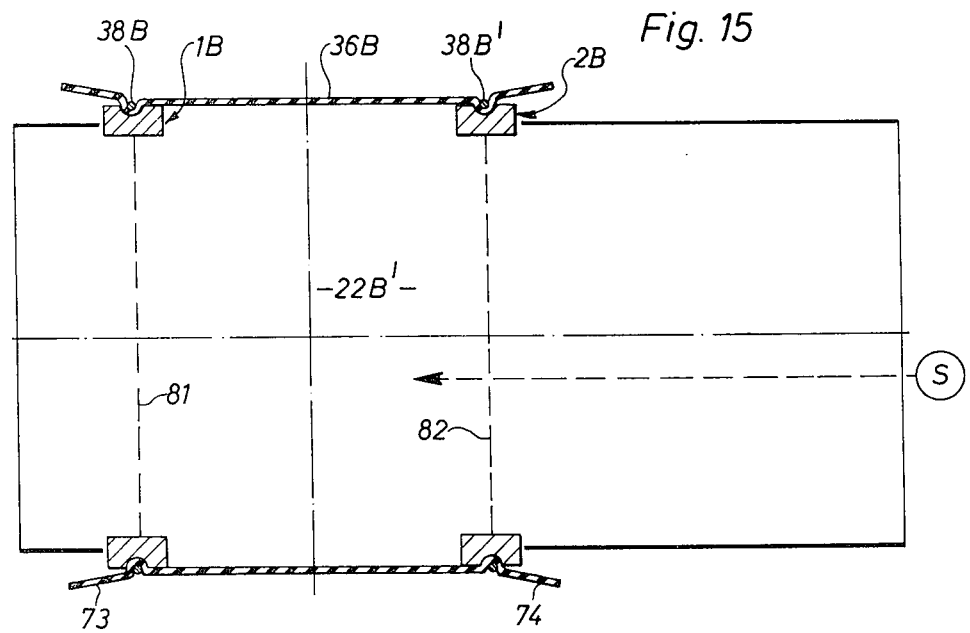
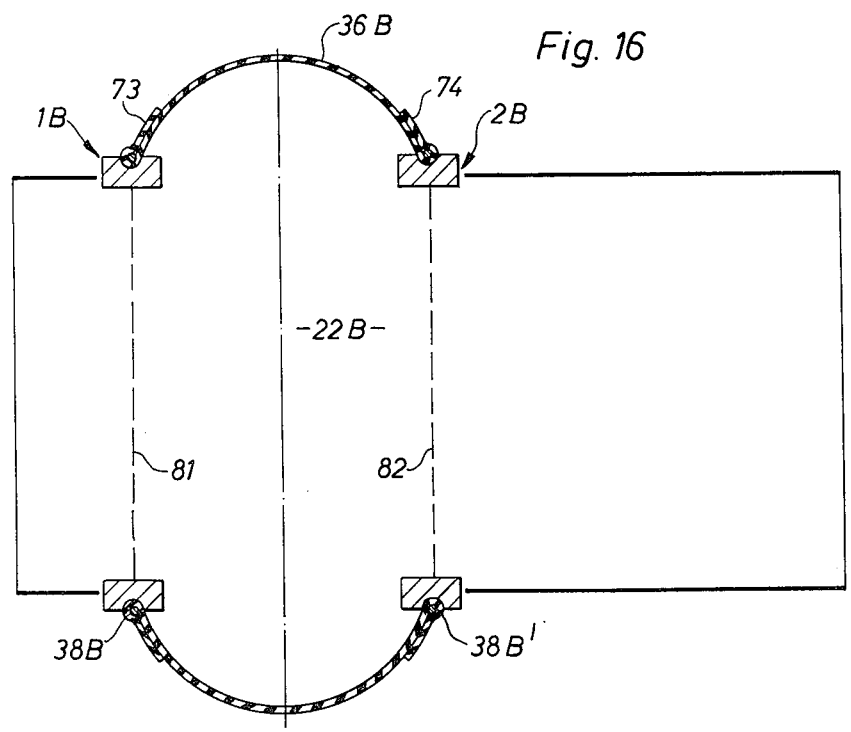

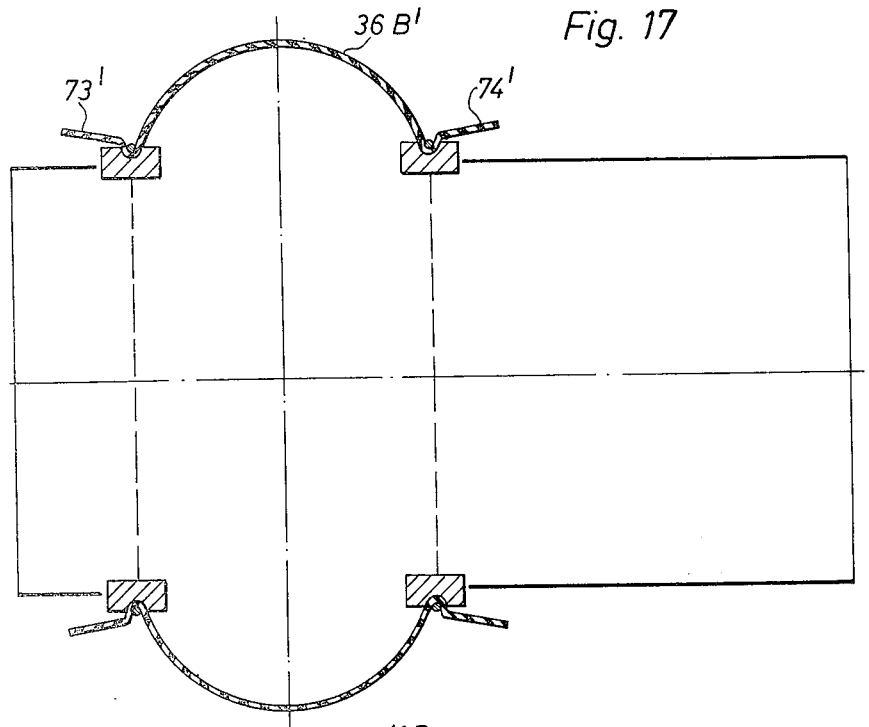
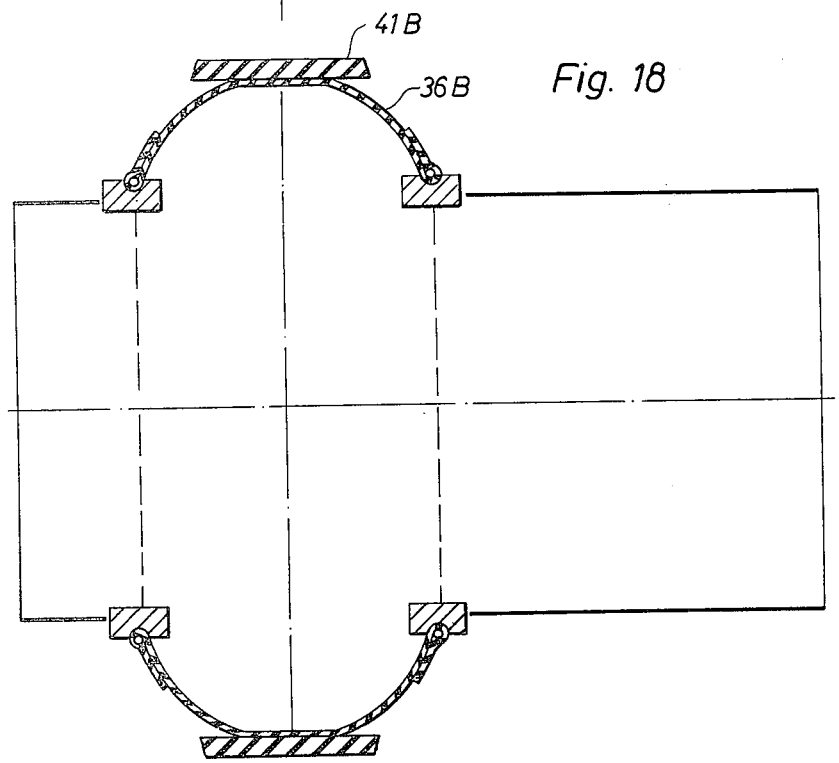

METHOD AND DRUM FOR BUILDING AND SHAPING BLANKS FOR RADIAL-PLY TIRES

This application is a continuation-in-part of copending application Ser. No. 271 125, filed July 12, 1972 now U.S. Pat. No. 3,862,871.

BACKGROUND OF THE INVENTION

1. Field of the Invention

The invention relates to a method and drum for building and shaping a blank for a radial-ply tire.

2. Description of the Prior Art

In the building of a tire the procedure generally comprises forming one or more cord webs into a cylindrical body on a tire building drum. This body is then given a toric shape either in a special expanding apparatus or in a tire heating press. In the manufacture of radial-ply tires it is usually necessary to carry out the expanding operation before introduction into a tire heating press, since the belt must previously be fastened to the tire blank.

In one known apparatus, as disclosed in U.S. Pat. No. 3,402,090 and German Offenlegungsschrift No. 1,579,266, an expanding drum has bead holders with which the beads of a previously built carcass can be brought into airtight engagement. For this purpose the bead holders have radially expansible grooves. Before the carcass is placed on the expanding machine, it must be built by winding a fabric band on a separately installed building drum. The known complete arrangement consisting of the building drum and the expanding drum necessitates additional operations for transferring the carcass, while still in its cylindrical shape, to the expanding drum.

SUMMARY

The problem underlying the present invention consists in further developing a machine of the above kind in such a way that transport from a building drum to an expanding drum is not necessary.

According to the invention there is provided a drum for building and shaping a blank for a radial-ply tire, said drum comprising two co-axial bead holders supported for axial movement relative one to the other, each said bead holder being radially expandable, the chamber between the bead holders being airtightly closed by a tire band applied peripherally to and extending between the bead holders, means arranged to introduce a fluid pressure medium into the chamber when closed by the tire band, and an extension drum co-axial with and extending from the face of at least one bead holder.

In the apparatus according to the invention a central drum, which would obstruct the movement of the bead holders towards one another during the expanding operation, is not provided between the bead holder parts which are movable relative to one another. When working with an apparatus according to the invention the tire band is laid partly on the bead holders and partly on an extension drum or drums. The bead holder parts are then moved so far apart that the edges of the tire band reach their correct position relative to the bead holders. During this adjusting movement the tire band is drawn off in the axial direction from the extension drum or drums. Through the arrangement of extension drums on the outer sides of the bead holders, it is possible to eliminate the obstructive intermediate drums, which can be used at all only if by means of a complicated construction they are made either axially collapsible or adapted to be removed radially inwards, in which case it is also necessary to make provision for the bead holders to be moved axially towards one another. The fabric from which the carcass is to be formed is firmly supported, which is important for the obtaining of an accurate shape. By combining the building drum and expanding apparatus it is possible to eliminate a transport operation, thereby achieving not only a saving in labor, but also a saving of space, since it is no longer necessary for intermediate storage to be provided for cylindrical carcasses awaiting further processing in an expanding apparatus.

Further according to the invention there may be provided between the bead holders at least one supporting element co-axial with the bead holders and arranged to be moved axially relative thereto on movement of the bead holders from the starting positions thereof so as to be symmetrically located between the bead holders. These supporting elements are not necessary in every case. When provided, they nevertheless make it impossible for the tire band to sag excessively downwards at the top in consequence of its own weight during the axial movement of the bead holders away from one another. Thus, such supporting elements are particularly advantageous in connection with heavy tire bands having little stiffness.

Still further according to the invention an extension drum may be associated with one only of the bead holders and the other bead holder is provided with a fastening device for the axial fastening thereto of a tire band.

It is, however, possible to dispense with fastening devices when working with a tire building drum which has an extension drum on only one bead holder, if the following procedure is adopted: the tire band is laid on the drum in such a manner that one side edge of the tire band is correctly aligned in relation to the bead groove of the bead holder not provided with an extension drum. Thereupon a bead core is placed in position over the groove of the bead holder in question and by expanding the bead groove the tire band is drawn into the latter and secured there by the bead core. The tire band is thereby fastened in relation to the bead holder in question. The latter is then moved away from the other bead holder until the opposite edge of the tire band has assumed its correct position relative to the bead holder provided with an extension drum. During this movement the tire band is drawn off from the extension drum. When the correct position in relation to the bead holder has been reached, the next bead core is clamped in position. The expanding operation can then take place in the usual way.

BRIEF DESCRIPTION OF THE DRAWINGS

FIG. 13 illustrates the elements of FIG. 12 after expanding of a bead holder;

FIG. 14 illustrates the elements of FIG. 13 after separation of the bead holders;

FIG. 15 illustrates the elements of FIG. 14 after expanding of the second bead holder;

FIG. 16 illustrates the elements of FIG. 15 after embossing of the tire band and pressing on of the projecting tire band ends;

FIG. 17 illustrates a method variation wherein the projecting tire band ends are pressed on after embossing, showing the elements of FIG. 15 after embossing but prior to pressing on of the projecting tire band ends;

FIG. 18 illustrates the elements of either of FIGS. 16 and 17 after pressing on of the projecting tire band ends and during mounting of a tire belt.

DESCRIPTION OF THE PREFERRED EMBODIMENTS

Figure 1:
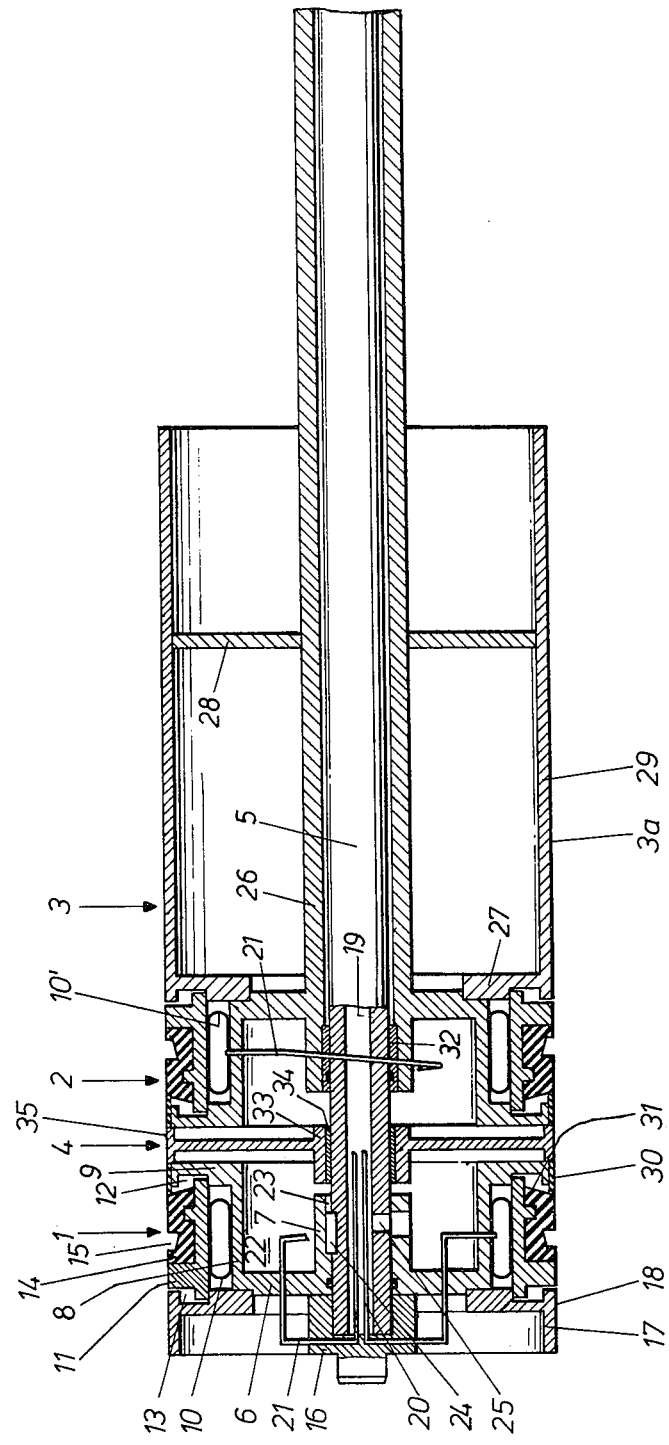
FIG. 1 is a longitudinal section through a tire building drum according to one embodiment of the invention, the drum being shown in the collapsed condition before a tire band is placed in position.

Referring to FIGS. 1 to 10 of the drawings, the main parts of the tire-building drum are a first bead holder 1, a second bead holder 2, an extension drum 3 attached to the outer side of the bead holder 2, and a supporting element 4 disposed between the bead holders 1 and 2.

The first bead holder 1 is fastened on the end of an axially slidable hollow bar 5. The bead holder 1 has a disc-shaped part 6 with a hub 7, which is mounted on the hollow bar 5. A cylindrical part 8 connects the part 6 with a radial part 9 parallel to the disc-shaped part 6. The bead holder 1 is fastened to the hollow bar 5 for rotation therewith by a key 24 engaged in a keyway 23 in the hub 7.

The outer surface of the cylindrical part 8 serves as support for a flexible hose 10, against the outer side of which rigid segments 11 bear. Laterally extending projections on the segments 11 engage in annular grooves 12 and 13 bounding the radial path of movement of the segments 11. The segments 11 are surrounded by a continuous resilient part 14 provided with an annular groove 15, which is intended to receive a bead core, as will be further described below. On the outer surface of the radial part 9 is fastened an elastic band 30 one edge of which lies against a conical surface 31 of the resilient part 14. The purpose of the band 30 is to seal a chamber 22 from atmosphere. If the band 30 were not provided, communication to atmosphere would be established through the slots between the segments 11. A cap 16 mounted on the end of the hollow bar 5 secures the bead holder 1 axially.

On the outer side of the bead holder 1 there is fastened centrally a short extension 17, the cylindrical outer surface 18 of which has the same diameter as that of the bead holder 1 when the segments 11 are in their radially inner position, as illustrated in FIG. 1.

Pressure medium pipes 20 and 21 are disposed in a cavity 19 in the bar 5. The pipe 20 leads into the interior of the hose 10 and the pipe 21 into the interior of the hose 10'. In the drawing part of the pipe 21 is broken away. The chamber 22 is in communication with the cavity 19 in the bar 5 by way of a radial bore 25 in the hollow bar 5 and a bore provided in the hub 7 and in line with the bore 25.

The bead holder 2 is substantially of the same construction as the bead holder 1. It is, however, the mirror image of the bead holder and is not fastened on the hollow bar 5 but on a hollow shaft 26 surrounding the bar 5. Pressure medium is supplied to the hose 10' through the pipe 21, which is independent of the pipe 20, in such a manner that the flow of pressure medium in the pipe 21 can be controlled independently of the flow of pressure medium in the pipe 20.

The extension drum 3 is fastened on the outer right-hand side of the bead holder 2. The cylindrical surface 3a of this drum has the same diameter as that of the bead holders 1 and 2 and the extension part 17 when the segments 11 of the bead holders 1 and 2 are in their radial inner position, which is shown in FIG. 1. For the purpose of fastening and centering it on the bead holder 2, the extension drum 3 has a radial part 27. Because of its relatively great length the extension drum is supported on the hollow shaft 26 in its rear region by means of a disc 28. The drum 3 has a closed peripheral surface 29 and it may be made in one piece.

As already stated, the supporting element 4 is disposed between the two bead holders 1 and 2. The supporting element 4 is in the form of a disc and has a hub 33 housing a bearing bush 34, which is a bearing for the hollow bar 5. The peripheral surface 35 of the supporting element 4 also has the same diameter as that of the bead holders 1, 2 and the extension drum 3.

The hollow bar 5 is arranged to slide out of the shaft 26 towards the left as viewed in FIG. 1. A bearing bush 32 on the shaft 26 serves to center the bar 5 in the shaft 26. The movement mechanism is not illustrated. Conventional means may be used for this purpose, such as for example hydraulic cylinders or threaded spindles. Moreover, the entire unit illustrated is mounted for rotation, the mounting and drive also not being shown.

The supporting element 4 is provided with a movement device (not shown), by means of which on the movement of the bead holders 1, 2 away from one another, that is to say on the movement of the bead holder 1 to the left as viewed in FIG. 1, the supporting element 4 is moved to the left at half speed, so that it is always situated centrally between the two bead holders 1 and 2.

The mode of operation of the tire-building drum will now be explained with reference to FIGS. 1 to 10.

Figure 2:
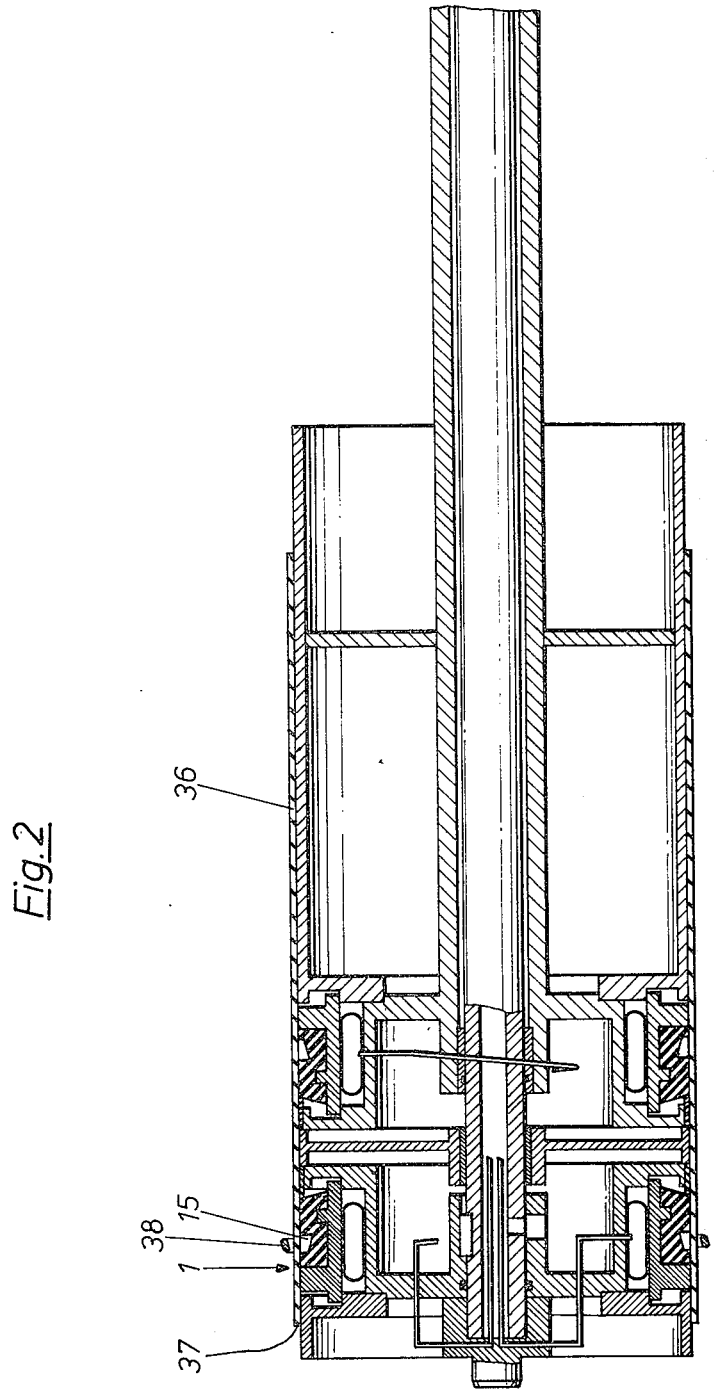
FIGS. 2 to 10 show various phases of the work with a tire building drum according to FIG. 1.

In FIG. 1 the building drum is shown in the starting position and forms a cylinder with a substantially smooth surface. In FIG. 2 a radial carcass ply for building a tire band 36, which may include a steel wire reinforcement, has been laid on the drum. The left-hand edge 37 of the tire band 36 is situated at the desired distance from the annular groove 15 of the left-hand bead holder 1. Above the annular groove 15 a bead core 38 has been placed in position and is held in this position by means of an auxiliary device (not shown). During the placing in position of the tire band 36 the entire drum has performed a revolution.

Figure 3:
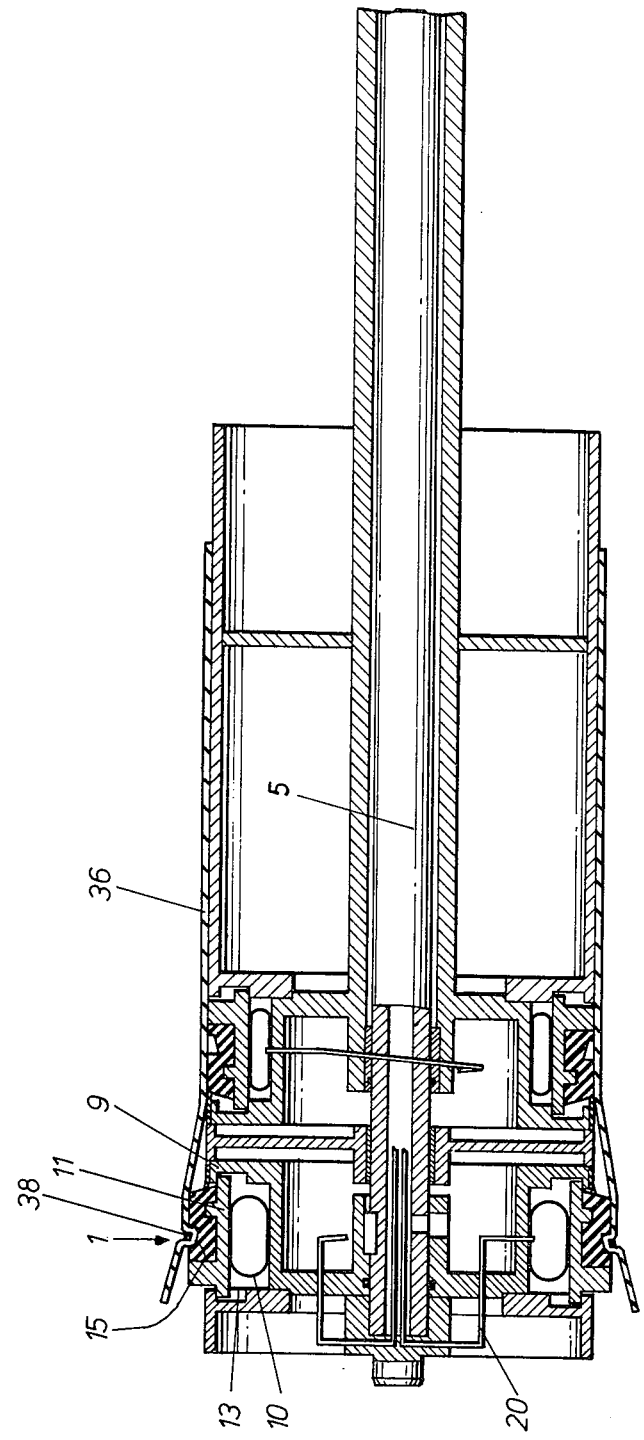

In the position shown in FIG. 3 the left-hand bead holder 1 has been expanded radially. This was effected by introducing a pressure medium into the hose 10 through the pressure medium pipe 20. The segments 11 have thereby been moved into their radially outermost position, which is limited by the bearing of the segments against the outer boundary walls of the annular grooves 12 and 13. As the bead holder 1 expanded, the bead core 38 pushed the tire band 36 into the annular groove 15. The bar 5 is now moved to the left, so that the left-hand bead holder 1 finally reaches the position shown in FIG. 4. The supporting element 4 has moved at half speed (the drive means achieving this is not shown) and has reached the position shown in FIG. 4, and is thus situated centrally between the bead holders 1 and 2. During the movement of the bead holder 1 the tire band 36 was pulled off the extension drum 3. The tire band was obliged to follow this pulling-off movement because it was held fast on the bead holder 1 by the bead core 38. The bead holder 1 moves to the left until the right-hand edge 39 of the tire band 36 is situated the desired distance from the annular groove 15'.

Figure 4:
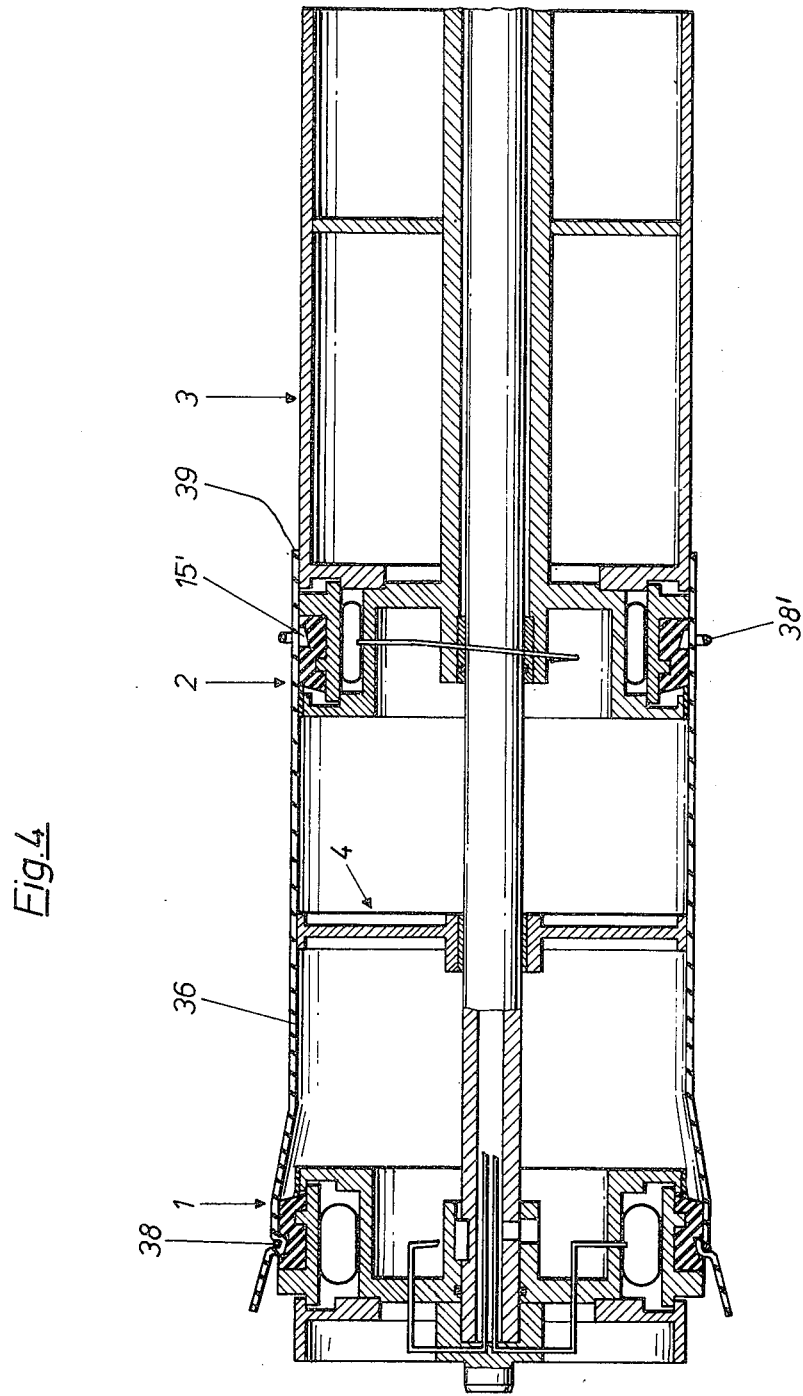
Figure 5:
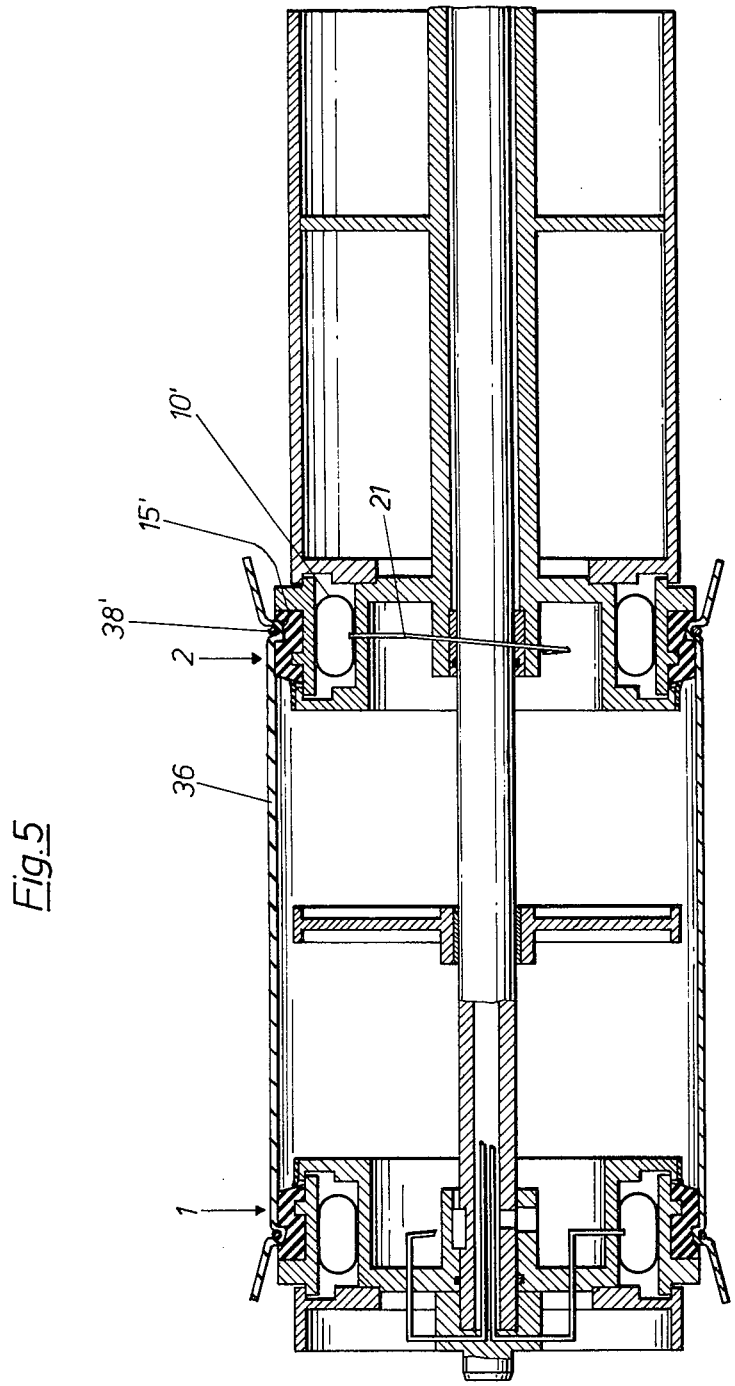

The right-hand bead holder 2 is now brought to the same diameter as the left-hand bead holder 1, after a bead core 38' has first been brought into position above the annular groove 15' (see FIG. 4). The bead core 38' now presses the tire band 36 into the bead groove 15'. Expansion being effected by introducing pressure medium into the hose 10' through the pressure medium pipe 21.

Figure 6:
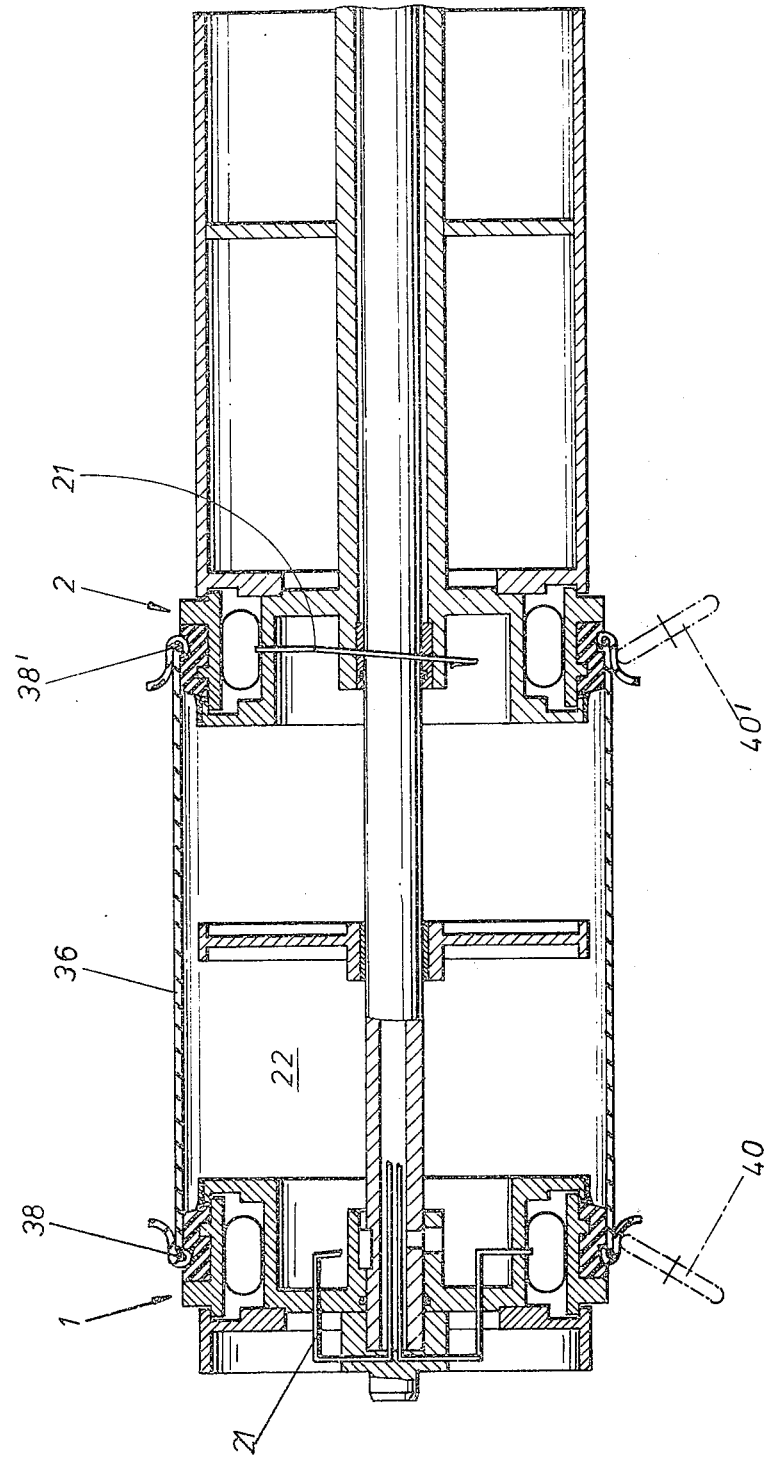

The drum is now rotated and the ends of the tire band 36 projecting beyond the bead core 38, 38' are bent over by means of pressing rollers 40 and 40', which are indicated by broken lines in FIG. 6.

Figure 7:
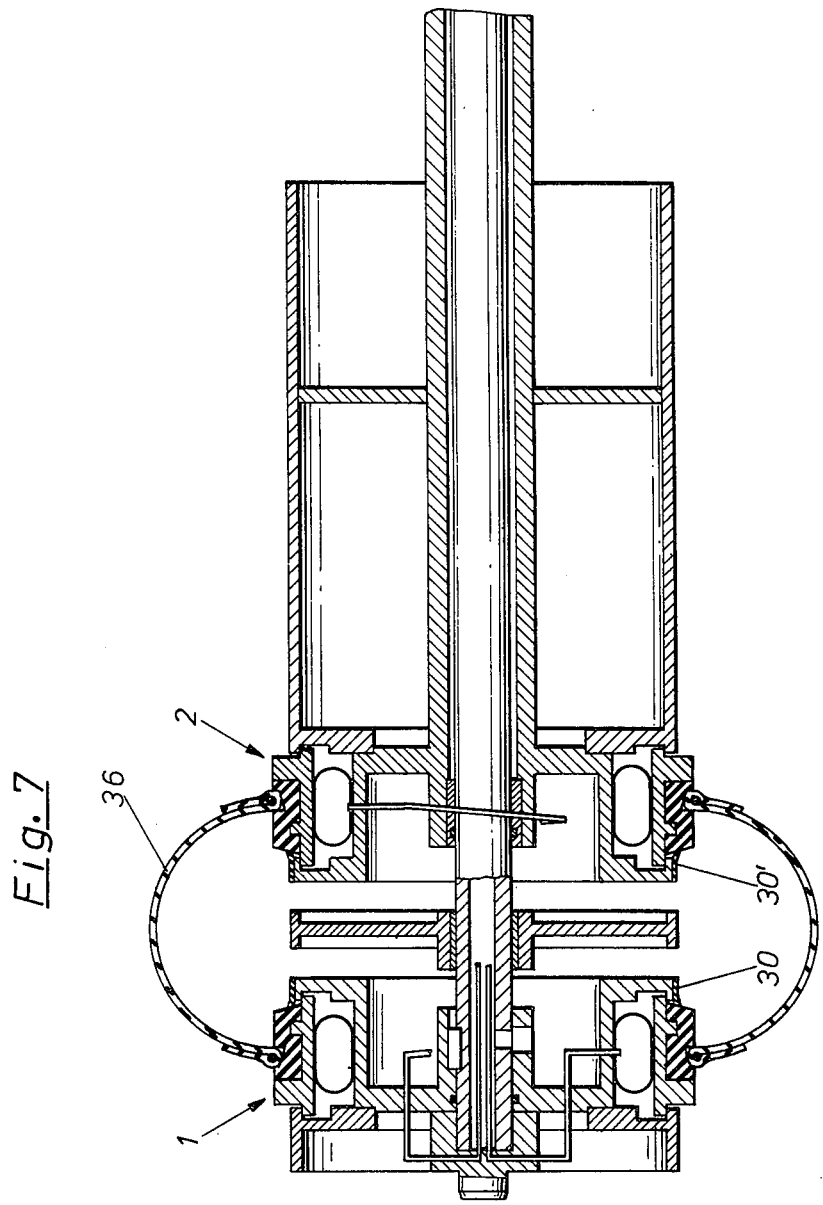
Figure 8:
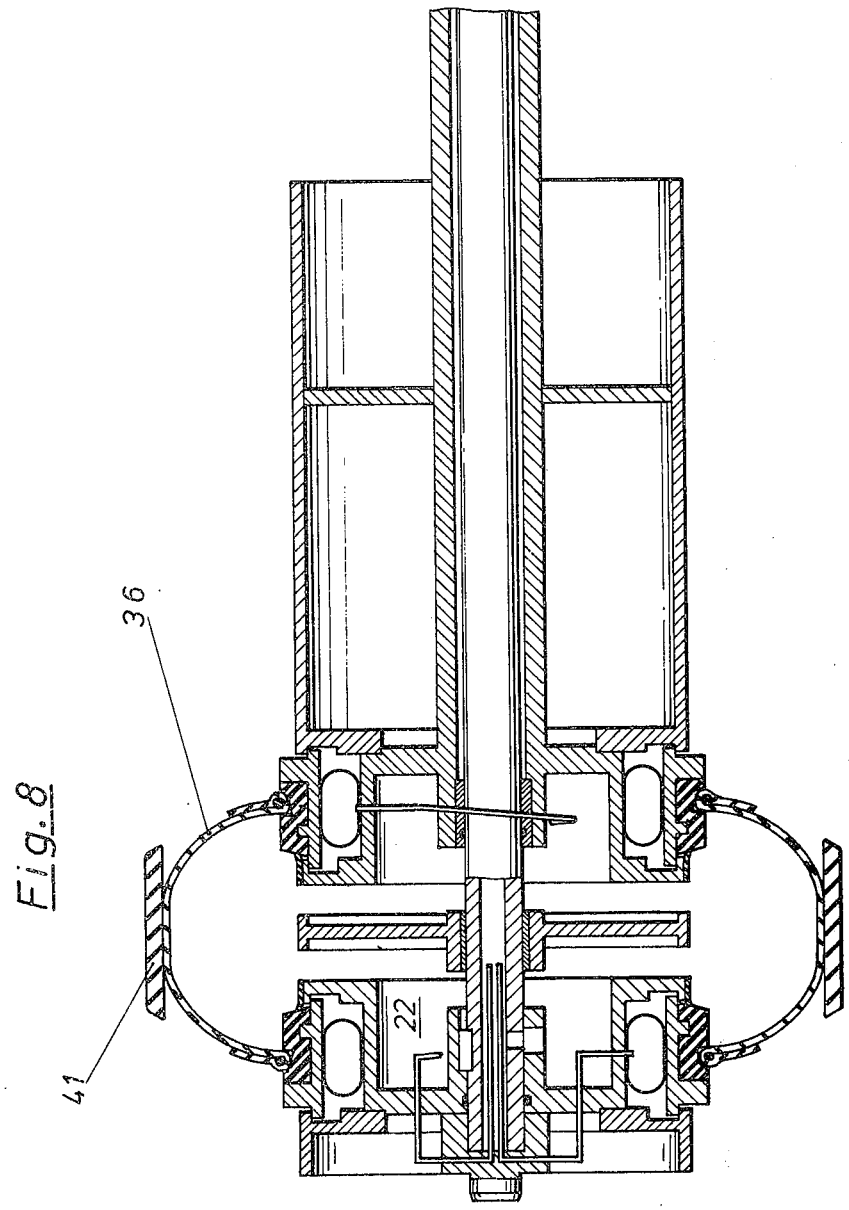

After the projecting ends have been bent over until they lie entirely on the layer of cord web situated beneath them, a pressure medium, preferably air, is introduced into the chamber 22 through the cavity 19 in the bar 5 and the radial bore 25. At the same time the bead holder 1 moves back to the right, as viewed in FIG. 1, towards the bead holder 2, so that the tire band 36 is curved into a toric shape. This shape is shown in FIG. 7. The left-hand holder 1 has here not quite been moved to the position in which it lies against the bead holder 2. A belt 41, FIG. 8, is now fastened on the curved tire band 36. The belt is placed in position with the aid of an auxiliary device (not shown) and the tire band 36 is pressed from inside against the belt 41 by the compressed air in the chamber 22. In FIG. 7 the sealing function of the elastic bands 30, 31' can also be clearly seen, these bands preventing pressure medium from flowing out through the slots between the segments 11.

Figure 9:
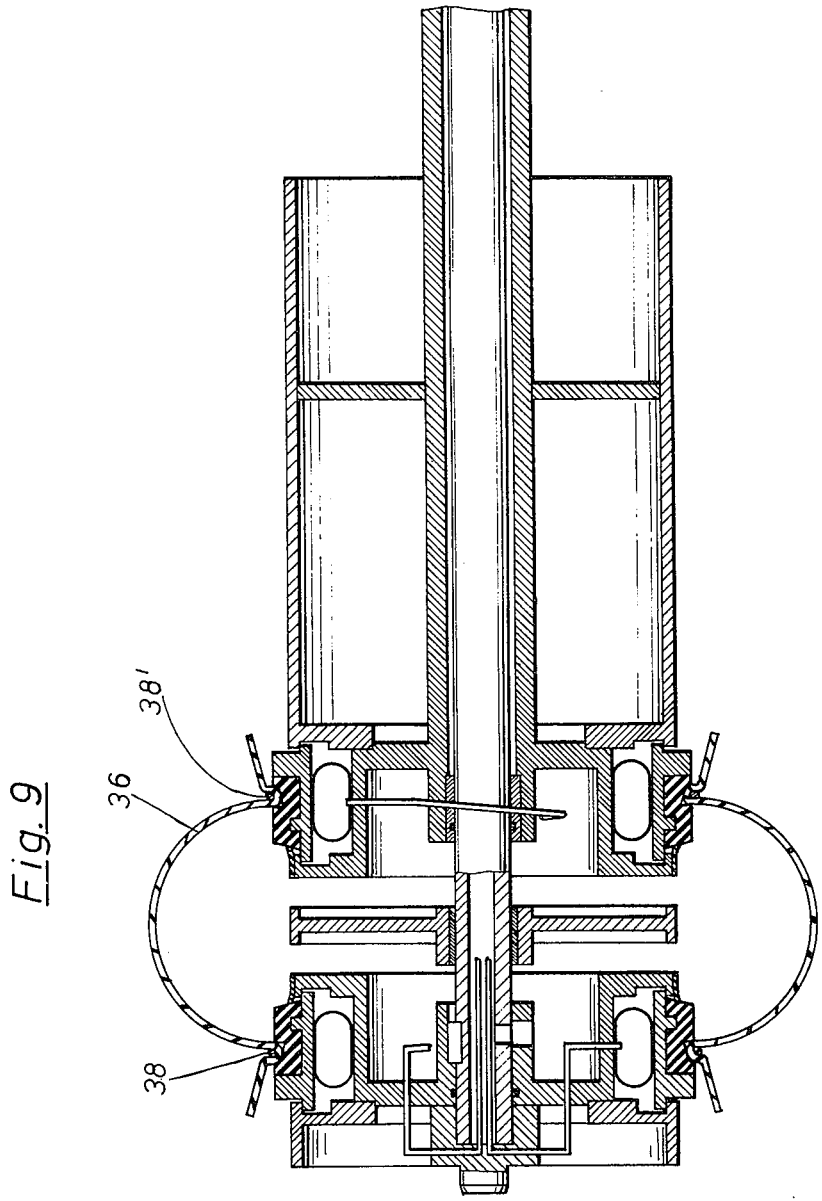
Figure 10:
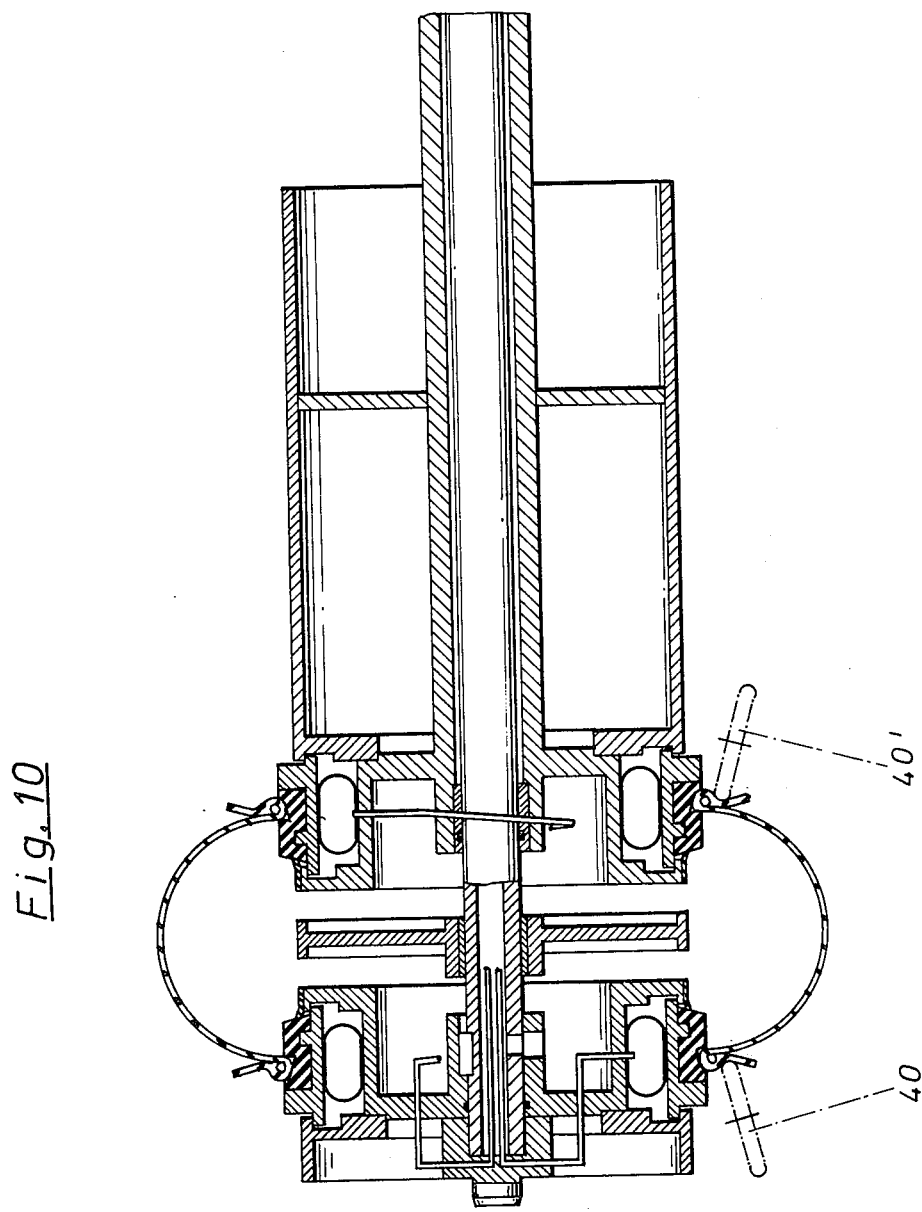

FIGS. 9 and 10 illustrate an alternative method of working. In this alternative the ends of the band projecting beyond the bead core 38, 38' are not bent over before the band is curved into shape. Bending-over is effected after the curved shape has been achieved, as illustrated in FIG. 10 in which once again the pressure rollers 40 and 40' are shown by broken lines. As compared with the previously described method according to FIGS. 1 to 8 this method provides the advantage that displacements, which otherwise occur to a certain extent during the curving movement, cannot occur inside the tire bead after the ends of the band have been folded over.

In the embodiment illustrated in FIGS. 1 to 10 a separate fastening device is not necessary, because fastening is effected by clamping on one bead holder. Instead of this clamping, however, it would also be possible to use a different fastening device, for example a fastening device of the type shown in FIGS. 12, 13 or 14, 15 of aforementioned parent application Ser. No. 271 125.

FIGS. 11 through 18 show diagrammatically an apparatus of the general type detailed in FIGS. 1 through 10 but wherein the supporting element 4 (FIG. 1) is not required and is omitted. Elements of FIGS. 11 through 18 corresponding to elements of FIGS. 1 through 10 are indicated by the same reference numerals with the suffix "B" added.

Figure 11:
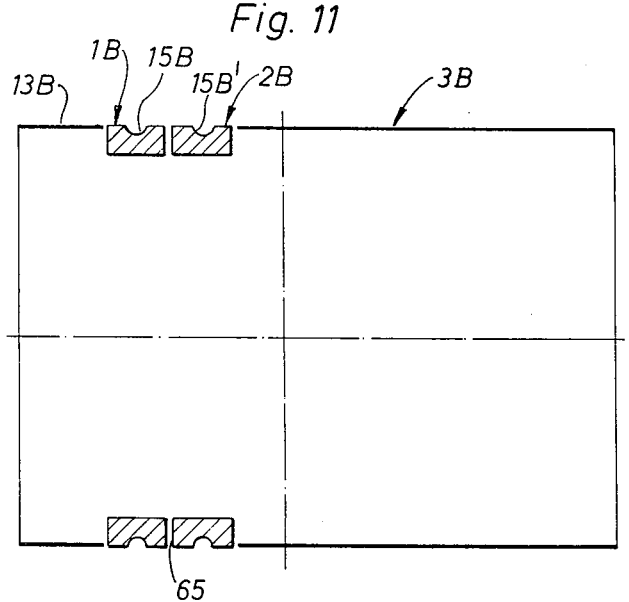
FIG. 11 is a diagrammatic longitudinal cross-sectional view of a tire-building drum substantially similar to that of FIG. 1 but omitting the supporting element, and showing the tire-building drum prior to the application of a tire band.

Thus, FIG. 11 discloses a tire-building drum having a first bead holder 1B and a second bead holder 2B. Bead holders 1B, 2B have radially expandable portions including grooves 15B and 15B'. A short extension 13B is fixed to the bead holder 1B and an elongate extension drum 3B is fixed to the bead holder 2B. Since no intervening supporting element, corresponding to supporting element 4 of FIG. 1, is provided between the bead holders 1B and 2B, such bead holders can be, and in their initial position of FIG. 11 are, pressed together closely, so that at most only a narrow gap 65 remains axially therebetween. Such would correspond to substantial abutment, or immediate adjacency, of radial parts 9 of bead holders 1 and 2 of FIG. 1, absent the supporting element 4.

Figure 12:
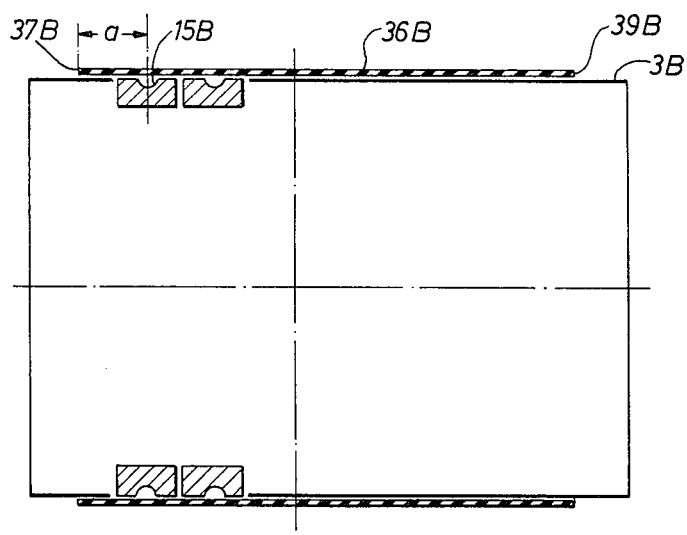
FIG. 12 illustrates the tire-building drum of FIG. 11 after application of a tire band, but prior to expanding of the bead holders.

In this initial close spaced condition of bead holders 1B and 2B (FIG. 11), a tire band 36B is applied onto the tire-building drum and formed into a closed ring by adhering, or gluing, together the overlapping circumferential ends of the tire band. The left axial end 37B and right axial end 39B of the tire band 36B are then located on the tire-building drum as shown in FIG. 12. The distance $a$ of the end 37B from the groove 15B corresponds to the width of the end of the tire band which will later be bent over a bead ring, as hereinafter discussed.

A bead ring 38B, preferably consisting of steel wires, is then located around the bead holder 1B, and the bead holder 1B is radially expanded to the extent that the bead ring 38B (which does not significantly expand) radially presses the tire band 36B into the groove 15B. In this manner, the tire band is fixed and can no longer shift relative to the bead holder 1B.

Subsequently, the other bead holder 2B is moved axially away from the bead holder 1B to its position shown in FIG. 14. Such pulls the tire band 36B off of the extension drum 3B or, in other words, the extension drum 3B is pulled out of the tire band 36B. In the position shown in FIG. 14, the right end 39B of the tire band 36B is axially spaced at the same distance $a$ from the adjacent groove 15B'.

This separation of the bead holders 1B and 2B can take place in various ways. For example, it is possible to maintain the bead holder 1B stationary and move only the bead holder 2B or, vice versa, to maintain stationary the bead holder 2B and move only the bead holder 1B. Moreover, it is contemplated also that both bead holders may be moved, wherein such movement may be symmetrical or asymmetrical. We intend all these possibilities to be included in the terminology "axially moving apart".

When the bead holders 1B and 2B are spaced apart at maximum distance (FIG. 14), a second bead ring 38B' is moved into position over the groove 15B' and the bead holder 2B is expanded to its condition of FIG. 15.

Compressed air from a source S is then introduced into the chamber 22B closed off by the tire band 36B and the generally radially extending wall portions 81 and 82 of the bead holders 1B and 2B respectively. Such wall portions 81 and 82 are indicated diagrammatically by broken lines in FIGS. 15 and 16 but will be understood to be defined by structures such as, in FIG. 1, the bead holder portions 6, 8, 9 and central closure afforded by parts 16 and 5. Simultaneously with the introduction of the compressed air, the bead holders 1B and 2B are brought closer to one another, i.e. to an intermediate position, to deform the tire band into the desired toroidal shape as in FIG. 16. Such decrease in the separation of the bead holders can be by movement of one or both thereof.

Prior to such decrease in the separation of the bead holders, the projecting end portions 73, 74 of the tire band 36B were turned over and pressed on the tire band (such not being illustrated in FIGS. 11–18). Such turning over of the end portions 73, 74 prior to embossing, or deformation to toroidal shape, is possible when bead rings 38B and 38B' of approximately circular cross section are used, as for a tire to be used with an innertube. On the other hand, for tires having bead rings of elongated oval or approximately hexagonal cross section (so-called hexagonal rings), it is advantageous to carry out the pressing on of the projecting tire band ends after embossing, as illustrated in FIGS. 17 and 18.

Thus, FIG. 17 shows an embossed tire band 36B' with the projecting ends 73' and 74' thereof not yet pressed on the tire band. Thus, it is only after embossing, in this instance, that the pressing on takes place to result in the condition shown in FIG. 18. Though the method variation illustrated in FIG. 17 is primarily used for bead rings of non-circular cross section, as normally employed in tubeless tires, FIG. 17 here illustrates bead rings of circular cross sections.

Finally, FIG. 18 additionally shows the mounting of a belt 41B, by means of any convenient holding mechanism not shown, around the tire band 36B.

The drawing FIGS. 11–15, and accompanying description thereof, in aforementioned parent application Ser. No. 271,125 are incorporated herein by reference.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method for building and shaping a tire carcass on a tire building drum having two radially expandable bead holders movable relative to one another, an extension drum on at least one bead holder, and means for feeding compressed gas into a chamber located between the bead holders, comprising the method steps:

A. bringing closely together the bead holders and thereby forming a substantially continuous cylindrical surface;
B. laying a tire band on said cylindrical surface with one axial end of the tire band spaced axially beyond said one bead holder by a distance $a$ equal to the length of the axial end portion of the tire band to be folded around a bead ring;
C. locating a bead ring around the tire band at said distance from said one axial end of said tire band and axially fixing the tire band to said one bead holder by expanding said one bead holder and thereby clamping said tire band against said bead ring;
D. axially moving apart said bead holders and thereby correspondingly spacing the other bead holder from the remaining free axial end of the tire band;
E. locating a further bead ring around the tire band in radial opposition to said other bead holder and expanding said other bead holder and thereby clamping said tire band against said further bead ring;
F. introducing a compressed gas into the chamber formed by the two bead holders and the tire band while simultaneously reducing the axial separation between said bead holders and thereby forming the substantially cylindrical tire band into a substantially toroidal shape.

2. Method of claim 1 in which said substantially continuous cylindrical surface includes both bead holders and said extension drum, said laying of said tire band on said cylindrical surface including laying said other axial end of said tire band on said extension drum and at a spacing from said other bead holder substantially exceeding said distance $a$, wherein said tire band is asymmetrically located with respect to said bead holders, and substantially continuously supporting said tire band axially from end to end thereof on said bead holders and extension drum.

3. The method of claim 2 in which said axially moving apart of said bead holders includes axially relatively sliding an intermediate portion of said tire band off said other bead holder and extension drum as said bead holders separate and substantially symmetrically locating the central portion of said tire band axially between the separated bead holders.

* * * * *